(12) United States Patent
Birlik et al.

(10) Patent No.: US 10,349,443 B2
(45) Date of Patent: Jul. 9, 2019

(54) UNIVERSAL REPEATER, A METHOD OF OPERATING A UNIVERSAL REPEATER AND A NETWORK INCLUDING THE SAME

(71) Applicant: AIRTIES KABLOSUZ ILETISIM SAN. VE DIS TIC. A.S., Istanbul (TR)

(72) Inventors: Firat Birlik, Istanbul (TR); Can Ihan, Istanbul (TR); Mehmet Karaca, Istanbul (TR)

(73) Assignee: AIRTIES KABLOSUZ ILETISIM SAN. VE DES TIC. A.S., Istanbul (TR)

( * ) Notice: Subject to any disclaimer, the term of this patent is extended or adjusted under 35 U.S.C. 154(b) by 0 days.

(21) Appl. No.: 14/729,662

(22) Filed: Jun. 3, 2015

(65) Prior Publication Data

US 2016/0174255 A1 Jun. 16, 2016
US 2017/0290051 A9 Oct. 5, 2017

Related U.S. Application Data

(60) Provisional application No. 62/007,291, filed on Jun. 3, 2014.

(30) Foreign Application Priority Data

Dec. 12, 2014 (GB) .................................. 14221865.0
Jun. 3, 2015 (GB) .................................. 1509625.8

(51) Int. Cl.
*H04W 74/00* (2009.01)
*H04W 76/10* (2018.01)
(Continued)

(52) U.S. Cl.
CPC .......... *H04W 74/004* (2013.01); *H04B 7/155* (2013.01); *H04W 24/02* (2013.01);
(Continued)

(58) Field of Classification Search
None
See application file for complete search history.

(56) References Cited

U.S. PATENT DOCUMENTS

2006/0009246 A1\* 1/2006 Marinier ............... H04W 8/005
455/502
2006/0014536 A1 1/2006 Demirhan et al.
(Continued)

FOREIGN PATENT DOCUMENTS

EP 2840860 A1 2/2015

OTHER PUBLICATIONS

Combined Search and Examination Report under Sections 17 and 18(3) for Application No. GB1509625.8 dated Dec. 1, 2015.
(Continued)

*Primary Examiner* — Donald L Mills
(74) *Attorney, Agent, or Firm* — Harness, Dickey & Pierce, P.L.C.

(57) ABSTRACT

A Universal Repeater (UR) configured to pair with an uplink in a network. The UR may include an interface configured to interface wirelessly with a uplink along a selected route between the UR and an access point (AP) in a network; and a memory having machine executable code therein that, when executed by a processor, causes the processor to determine the uplink based on data received from a plurality of candidate uplinks, and instruct the interface to pair with the uplink.

18 Claims, 10 Drawing Sheets

(51) Int. Cl.
  *H04W 24/02* (2009.01)
  *H04W 84/12* (2009.01)
  *H04W 28/18* (2009.01)
  *H04B 7/155* (2006.01)
  *H04W 76/14* (2018.01)
  *H04W 16/26* (2009.01)

(52) U.S. Cl.
  CPC ........... *H04W 28/18* (2013.01); *H04W 76/10* (2018.02); *H04W 84/12* (2013.01); *H04W 16/26* (2013.01); *H04W 76/14* (2018.02)

(56) References Cited

U.S. PATENT DOCUMENTS

| | | | |
|---|---|---|---|
| 2006/0199530 A1 | 9/2006 | Kawasaki | |
| 2007/0237110 A1* | 10/2007 | Bennett | H04W 76/06 370/328 |
| 2007/0274320 A1 | 11/2007 | Joshi et al. | |
| 2009/0141667 A1* | 6/2009 | Jin | H04B 7/2606 370/315 |
| 2009/0180396 A1 | 7/2009 | Kish | |
| 2009/0252078 A1 | 10/2009 | Lim et al. | |
| 2009/0310544 A1* | 12/2009 | Jain | H04L 45/24 370/329 |
| 2010/0091669 A1* | 4/2010 | Liu | H04L 45/20 370/252 |
| 2010/0150118 A1* | 6/2010 | Daum | H04L 5/0082 370/338 |
| 2010/0226342 A1* | 9/2010 | Colling | H04W 56/002 370/336 |
| 2012/0014362 A1* | 1/2012 | Inada | H04W 40/22 370/338 |
| 2013/0100852 A1* | 4/2013 | Jeon | H04L 45/20 370/254 |
| 2013/0279409 A1 | 10/2013 | Dublin, III et al. | |
| 2014/0341070 A1* | 11/2014 | Shen | H04W 76/02 370/254 |

OTHER PUBLICATIONS

International Search Report dated Aug. 17, 2015 for International Application No. PCT/IB2015/054203.

* cited by examiner

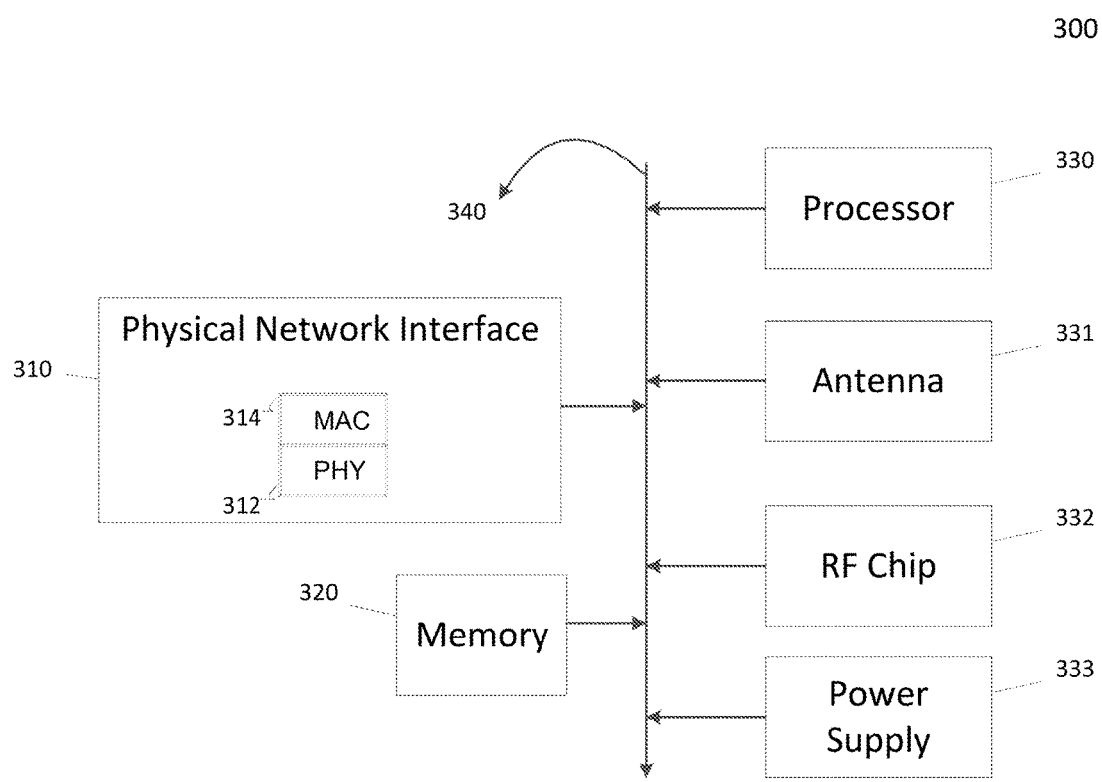

FIG. 5

| Source Address (SA) | Destination Address (DA) | BSSID | Timestamp | Capability Info | SSID | Supported Rates | FH Para Set | TIM | Information Element (IE) |
|---|---|---|---|---|---|---|---|---|---|
| | | | | | | | | | |

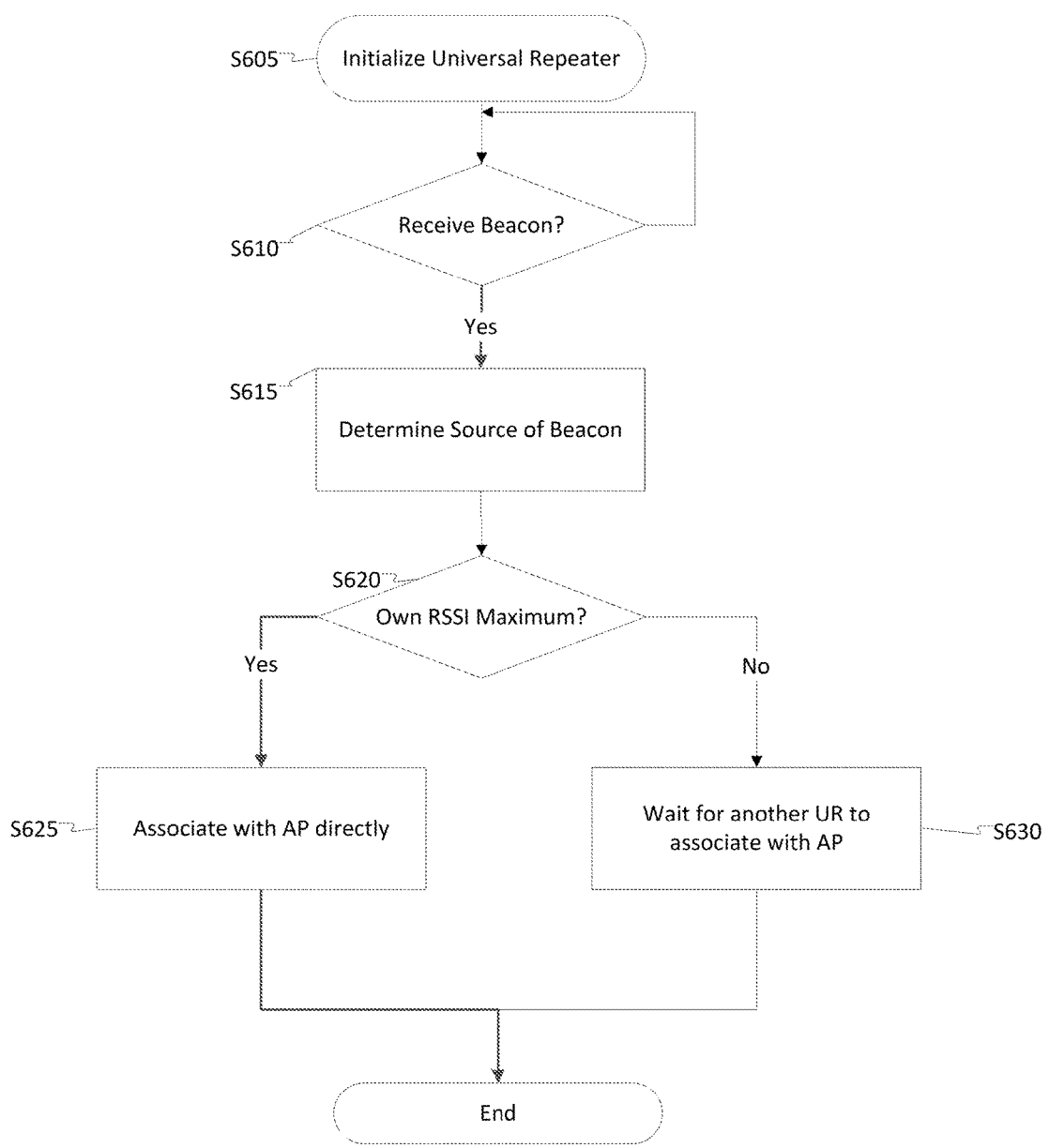

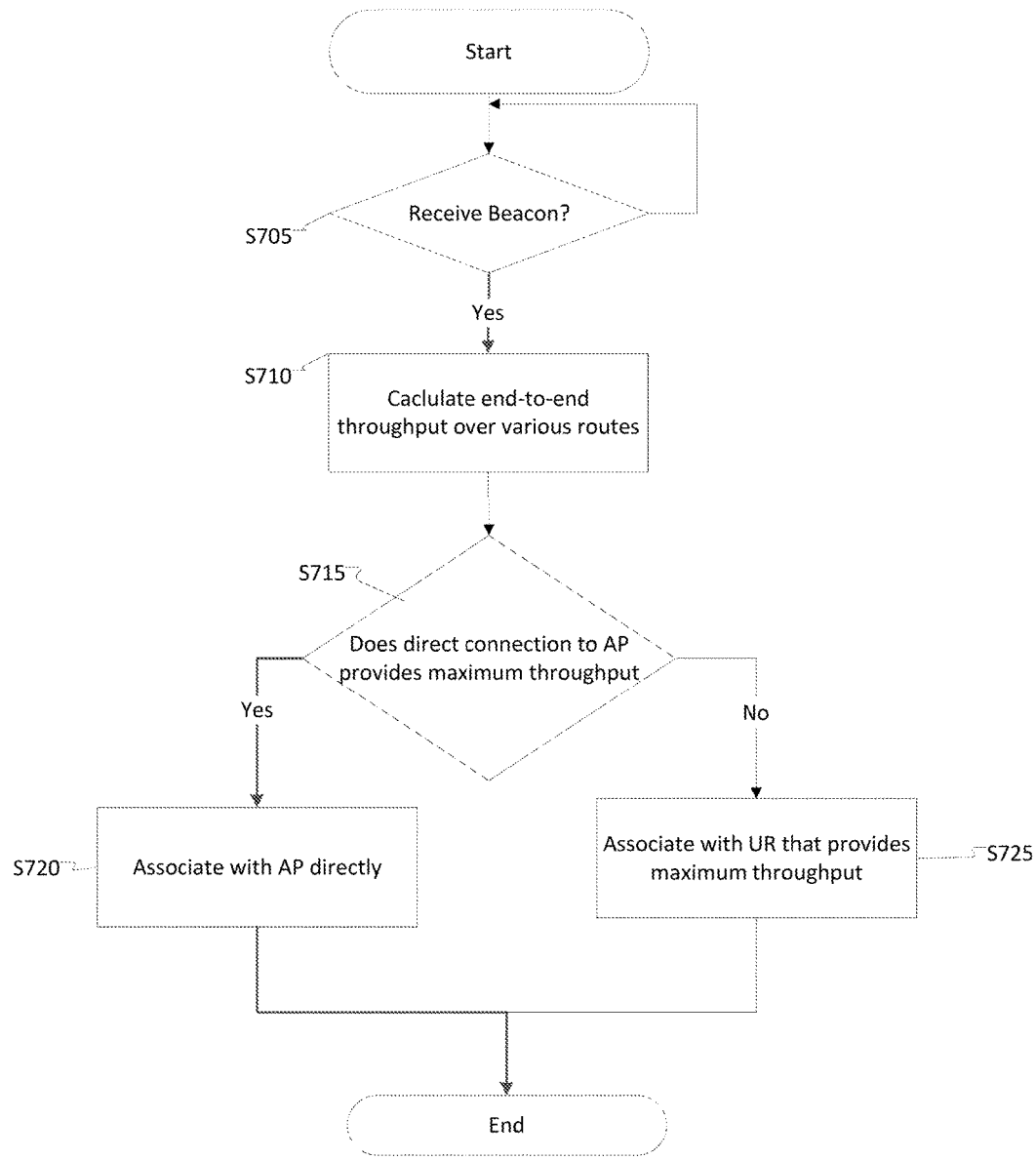

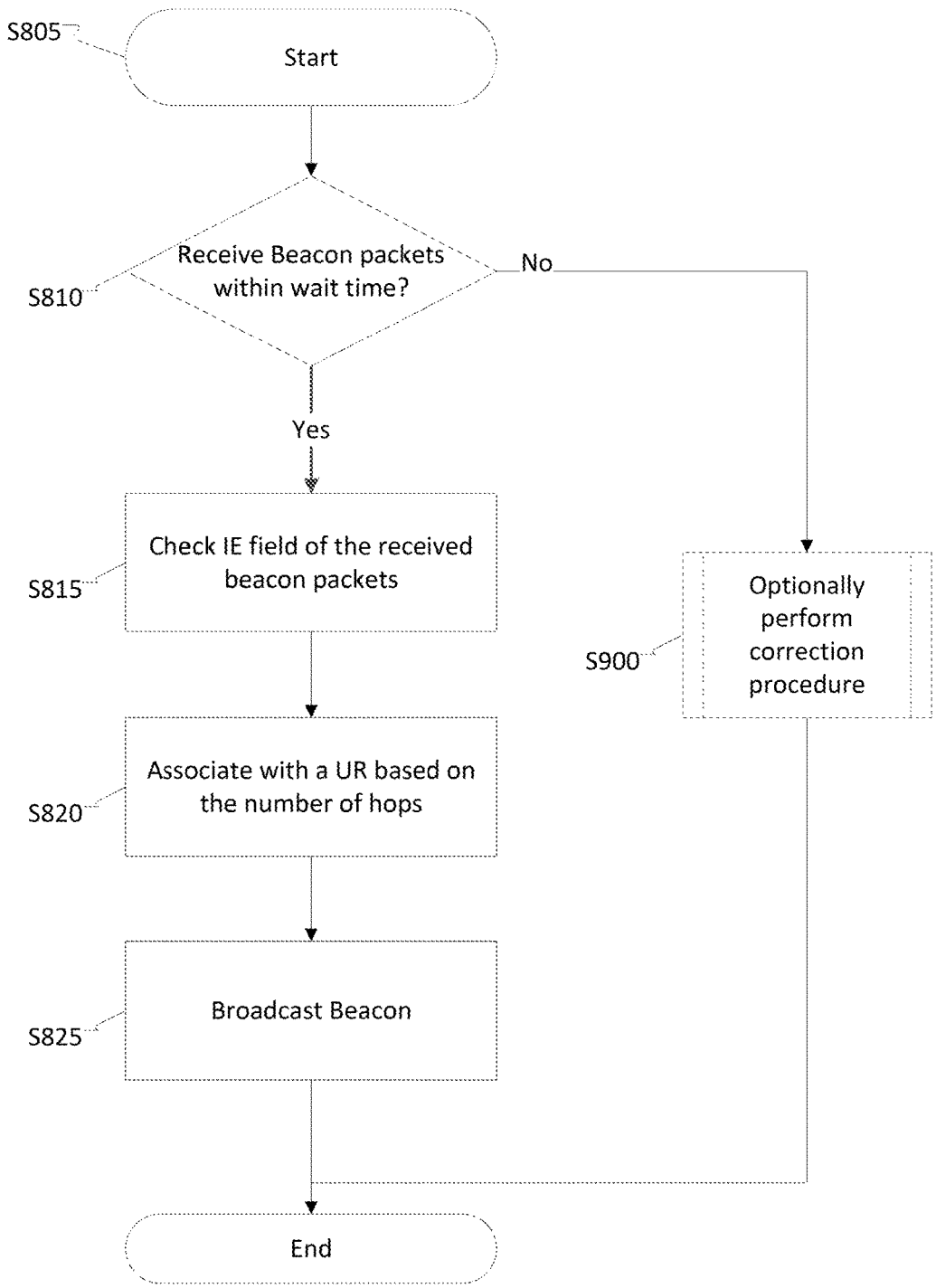

UNIVERSAL REPEATER, A METHOD OF OPERATING A UNIVERSAL REPEATER AND A NETWORK INCLUDING THE SAME

PRIORITY INFORMATION

This application claims priority from U.S. Provisional Application No. 62/007,291 filed Jun. 3, 2014, GB Patent Application No. 1422186.5 filed Dec. 12, 2014, and GB Patent Application No. 1509625.8 filed on Jun. 3, 2015, the contents of all of which are incorporated herein by reference in their entirety.

BACKGROUND

An access point (AP) may provide networking capabilities to user equipment (UEs) connected thereto. The AP may be part of a wireless local access network (WLAN). IEEE 802.11 based Wireless Local Area Networks (WLANs) have been deployed in many locations such as homes, schools, hospitals and cafes. WLANs enable users to connect to the internet with great flexibility and at a low-cost. However, due to harmful effects of wireless medium such as walls between transmitters and receivers and the fading of signals, the throughput achieved by clients in a given WLAN may be sub-optimal. Furthermore, a client may experience some level of loss of connection from the access point (AP) to which the client is connected. This is known as the wireless coverage problem which causes distortion in the wireless communication between clients and the APs. Hence, it is important to find efficient and low-cost methods which provide full connectivity in WLANs by extending the range of connectivity between the clients and the APs.

To extend the range, the transmit power of the transmitting nodes (e.g., the AP(s) and/or the client(s)) in the network may be increased. However, increasing the transmission power of the nodes may result in the node consuming more power and/or causing interference in the network.

SUMMARY

Example embodiments relate to at least a universal repeater (UR), a method of operating a universal repeater (UR) and/or a network including the same.

In some example embodiments, the UR may include an interface configured to interface wirelessly with a uplink along a selected route between the UR and an access point (AP) in a network; and a memory having machine executable code therein that, when executed by a processor, causes the processor to, determine the uplink based on data received from a plurality of candidate uplinks, and instruct the interface to pair with the uplink.

In some example embodiments, the data received from the plurality of candidate uplinks is indicative of an end-to-end throughput from the UR to the AP via each of the plurality of candidate uplinks.

In some example embodiments, the data is piggybacked in one or more fields of beacon packets, and the processor is configured to demodulate the beacon packets to read the data.

In some example embodiments, the beacon packet is a management packet defined by IEEE 802.11.

In some example embodiments, the processor is configured to determine the uplink based on the end-to-end throughput of each of the plurality of candidate uplinks.

In some example embodiments, the machine executable code, when executed by the processor, causes the processor to determine the uplink based at least in part on a number of hops between the UR and the AP.

In some example embodiments, the machine executable code, when executed by the processor, causes the processor to determine the uplink by, receiving beacon packets from the plurality of candidate uplinks, determining a number of hops between the plurality of candidate uplinks and the AP, and pairing with one of the plurality of candidate uplinks based on the determined number of hops.

In some example embodiments, the machine executable code, when executed by the processor, causes the processor to determine the number of hops by analyzing an information element (IE) field included in the received beacon packets.

In some example embodiments, the machine executable code, when executed by the processor, causes the processor to pair with the candidate uplink having a lowest number of hops to the AP.

In some example embodiments, the machine executable code, when executed by the processor, causes the processor to determine the uplink based on a number of hops between the UR and the AP and one or more of a signal strength and a Physical Layer bitrate between the UR and the plurality of candidate uplinks.

In some example embodiments, the machine executable code, when executed by the processor, causes the processor to broadcast a new beacon packet to the plurality of candidate uplinks after pairing with one of the candidate uplinks, the new beacon packet including an indication of the number of hops between the UR and the AP over the selected route.

In some example embodiments, the interface is configured to pair with the determined uplink over a media access control (MAC) layer therein.

In some example embodiments, the network is a wireless network operating based on IEEE 802.11 standard.

In some example embodiments, the method of determining an uplink for a universal repeater (UR) includes determining the uplink based on data received from a plurality of candidate uplinks, and instructing the interface to wirelessly pair with the uplink along a selected route between the UR and an access point (AP) in a network.

In some example embodiments, the data received from the plurality of candidate uplinks is indicative of an end-to-end throughput from the UR to the AP via each of the plurality of candidate uplinks.

In some example embodiments, the data is piggybacked in one or more fields of beacon packets, and the method further includes demodulating the beacon packets to read the data.

In some example embodiments, the beacon packet is a management packet defined by IEEE 802.11.

In some example embodiments, the determining the uplink determines the uplink based on the end-to-end throughput of each of the plurality of candidate uplinks.

In some example embodiments, the determining the uplink determines the uplink by, receiving beacon packets from the plurality of candidate uplinks, determining a number of hops between the plurality of candidate uplinks and the AP, and pairing with one of the plurality of candidate uplinks based on the determined number of hops.

In some example embodiments, the determining the number of hops determines the number of hops by analyzing an information element (IE) field included in the received beacon packets.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein:

FIG. 3 is a block diagram illustrating a universal repeater according to some example embodiments;

FIG. 5 illustrates a structure of a beacon frame according to some example embodiments;

FIG. 6 is a flow chart illustrating a method of an initial universal repeater (UR) determining an uplink according to some example embodiments;

FIG. 7A is a flow chart illustrating a method of subsequent universal repeaters (URs) determining an uplink according to some example embodiments;

FIG. 8 is a flow chart illustrating a method of a universal repeater (UR) determining an uplink according to some example embodiments.

DETAILED DESCRIPTION OF EXAMPLE EMBODIMENTS

Figure 1:
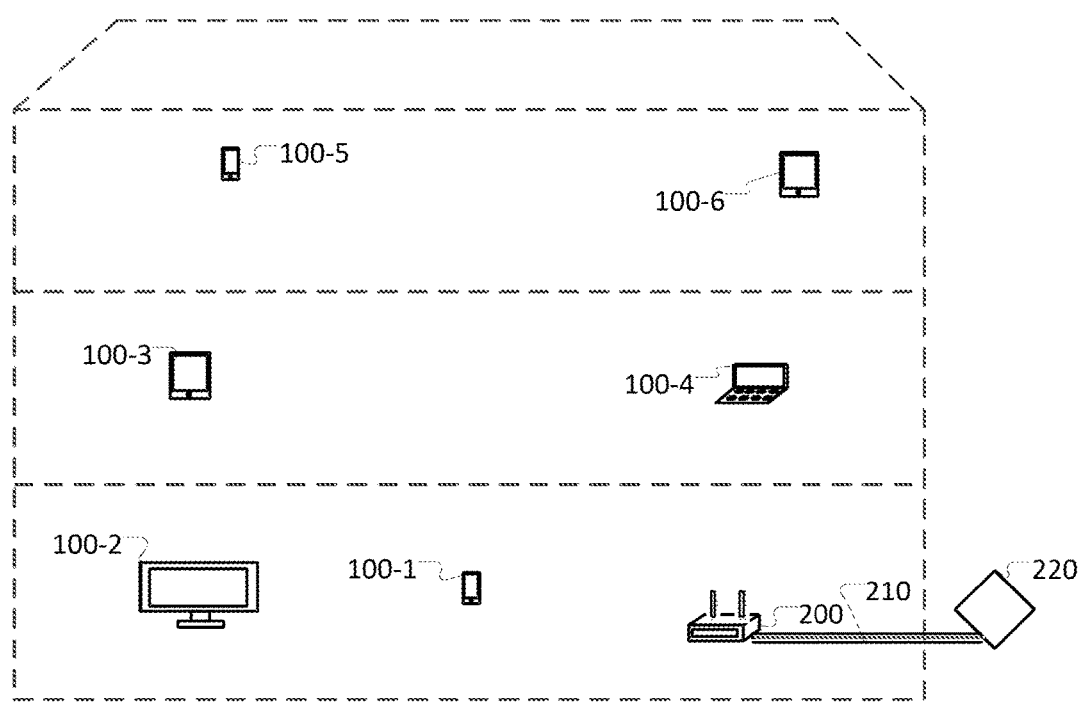
FIG. 1 is a block diagram illustrating a networking environment according to some example embodiments.

Various example embodiments will now be described more fully with reference to the accompanying drawings. Like elements on the drawings are labeled by like reference numerals.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative example embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. However, example embodiments are not limited to these given implementations.

As used herein, the term "user equipment" (UE) may be considered synonymous to, and may hereafter be occasionally referred to, as a phone, wirelessly equipped laptop, a mobile, mobile unit, mobile user, subscriber, user, remote station, access terminal, tablet, receiver, smart television, etc., and may describe a remote user of wired or wireless resources in a network. The term "Access Point" (AP) may be considered synonymous to and/or referred to as a wired and/or wireless router, hub, switch, a public gateway, a public/private gateway, and/or other source of audio and/or data transmission usable by various UEs and may describe equipment that provides data and/or audio connectivity between the network and one or more UEs.

Example embodiments may be utilized in conjunction with Radio Access Networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

FIG. 1 is a block diagram illustrating a networking environment according to some example embodiments.

Referring to FIG. 1, a networking environment may include various pieces of User Equipment (UEs) 100 and an Access Point (AP) 200 and other networking equipment arranged throughout the networking environment.

The networking environment may be an IEEE 802.11 WLAN. The WLAN may enable connection to the internet 220 via the AP 200 through a gateway. A connection 210 between the AP 200 and the internet 220 may be a wired communication via for example, a fiber optic cable.

Various consumer electronic devices including, but not limited to, mobile devices, handheld electronic devices, laptops, etc., (hereinafter collectively referred to as UEs 100), located on different floors of a home, may connect to the internet 220 by establishing a connection with the AP 200.

Wireless communications between the AP 200 and the UE 100 may be highly dynamic in nature due to super composition of multiple effects such as path-loss, multi-path fading, shadowing, etc. These effects may significantly degrade the exchange of data by the UE 100 especially when high rate of data transmission is required (e.g., during a streaming of a video). Hence, a minimum level of signal strength at the UE 100 may be desired such that communication at a desirable data transmission rate can be supported.

In the networking environment as shown in FIG. 1, there may be multiple floors with walls, as a result of which the effect of path-loss and fading may increase. In such scenarios, the distance between the AP 200 and the UEs 100, for example, UE 100-5 may be too long for a direct connection to be established.

In order to address the insufficient data transmission rate, a universal repeater (UR) may be introduced within the networking environment, as will be described below.

Figure 2:
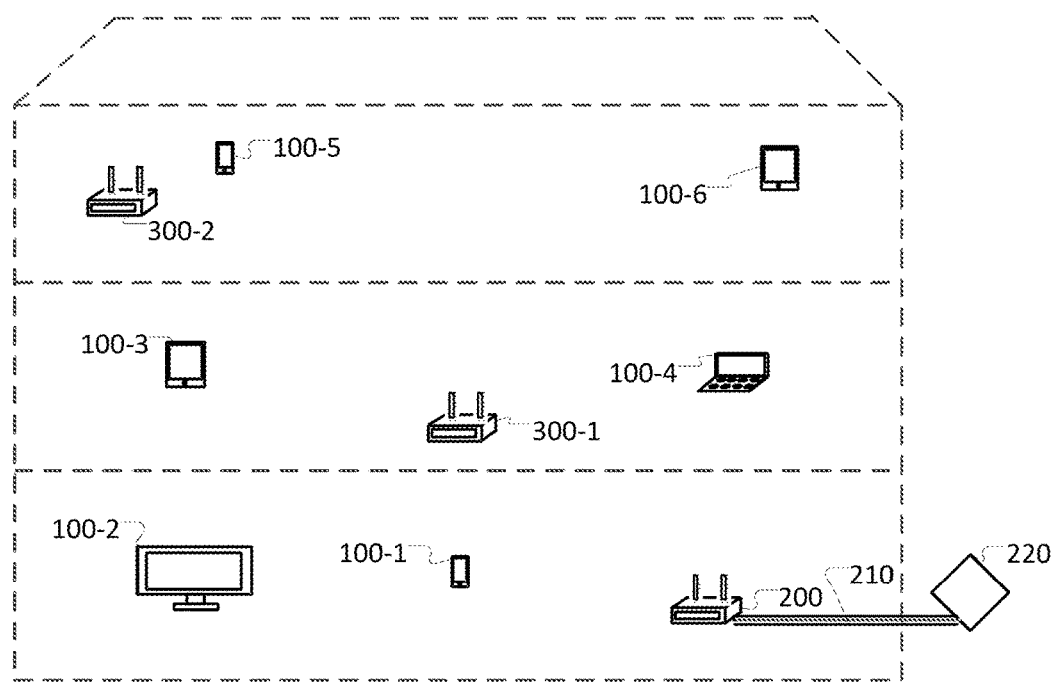
FIG. 2 is a block diagram illustrating a networking environment including universal repeaters (URs) according to some example embodiments.

FIG. 2 is a block diagram illustrating a networking environment including universal repeaters (URs) according to some example embodiments.

Referring to FIG. 2, URs 300 may be added to the networking environment to mitigate the inefficiencies of direct data transmission rate between the UEs 100 and the AP 200, as described above. For example, a first UR 300-1 and a second UR 300-2 may be added to the networking environment. While two URs 300-1 and 300-2 are illustrated in FIG. 2, one of ordinary skill in the art will appreciate that more or less than two URs 300 may be included in the networking environment.

As discussed herein, a processor in each of the URs 300 executes computer code stored in memory that, when executed, configures the URs 300 as a relay node between the AP 200 and the UEs 100 such that the URs 300 transmit signals between the AP 200 and the UE 100. The URs may be configured to perform on-the-fly uplink selection among a plurality of candidate uplinks in the networking environment based on, for example, the end-to-end aggregate throughput.

Because a connection between the URs 300 and the AP 200 may be relatively stronger than a direct connection between the UEs 100 and the AP 200, the URs 300 may mitigate the inefficiencies of direct data transmission. Therefore, the URs 300 may improve the aggregate throughput in the data communicated between the UEs 100 and the AP 200.

The processors in each of the URs 300 may execute computer code that configures the URs 300 to selectively switch between a client mode and an access point mode such that the URs 300 can serve a relay. In the client mode, the URs 300 may associate with an uplink to enable data transmission therethrough. Further, once associated with an uplink, in the access point mode, the URs 300 may act as an access point (AP) to relay data between the UEs 300 and the AP 200.

Conventionally, a UR 300 may associates with the closest transmitter that provides the maximum signal strength. However, signal strength based association may be inefficient for multiple-hop data transmission in terms of data throughput performance, and may significantly degrade the overall throughput of the network. Such degradation may be due to the fact that multiple-hop data transmission may require multiple transmissions of the same data, which may introduce additional delay thus reducing the overall throughput in the WLAN. Therefore, further information regarding the upstream nodes may need to be considered prior to choosing an uplink in a multiple hop data transmission scheme. These concepts will be further described below.

FIG. 3 illustrates a universal repeater according to some example embodiments.

Referring to FIG. 3, each of the URs 300 may include, for example, a network interface 310, a memory 320, a processor 330, an antenna 331, an RF chip 332, a power supply 333 and a data bus 340. The network interface 310 may include at least a physical layer interface (PHY) 312 and a media access control (MAC) layer 314 of an Open System Interconnection (OSI) model. The physical layer 312 may be a layer 1 and the link layer 314 may be a layer 2 layer in the OSI model.

The physical layer (PHY) layer 312 may include basic hardware transmission technologies allowing the URs 300 to transmit raw bits rather than logical data packets over a physical link.

The network interfaces 310, memory 320, processor 330, antenna 331 and RF chip 332 are adapted to send data to and/or receive data from one another using the data bus 340 such that the data bus 340 bus enables bidirectional data communications. Further, the network interfaces 310, memory 320, processor 330, antenna 331, RF chip 332 receive an operating power from the power supply 333. In some example embodiments, the power supply 333 is connected to a power source via a power plug.

Each of the network interfaces 310 includes ports to receive and/or transmit signals using a transmitter and/or a receiver. For example, the network interface 310 may utilize the antenna 331 to transmit and/or receive wireless signals and the RF chip 332 may process radio frequency signals.

The RF chip 332 may convert data packets for communication, to radio waves, which are then transmitted over the wireless medium via antenna 331.

The transmitters may include devices that include hardware and any necessary software for transmitting signals including, for example, data signals, control signals, and signal strength/quality information via the associated interface to other network elements in the network environment. The receivers may include devices that include hardware and any necessary software for receiving signals including, for example, data signals, control signals, and signal strength/quality information via the associated interface to other network elements.

The processor 330 may include any device capable of processing data including, for example, a microprocessor configured to carry out specific operations based on input data, or capable of executing instructions included in computer readable code. The processor 330 may be configured to read a software program from the memory 320 and execute the program to implement the functions of the UR 300 such that the UR 300 is a special purpose computer configured to perform the operations which will be further described below. The computer readable code may be stored on, for example, the memory 320. The processor 330 and the memory 320 can be configured as separate components or can be configured as one.

The functions performed by the URs 300 may be implemented with a 'module'. The 'module' may include a software element or a hardware element, such as a field programmable gate array (FPGA) or an application specific integrated circuit (ASIC), and the module may perform functions. However, the module is not limited to software or hardware. The module may be configured to be in a storage medium that may address the module or to execute one or more processors.

As an example, the module may include elements, such as software elements, object-oriented software elements, class elements, and task elements, processes, functions, properties, procedures, subroutines, segments for a program code, drivers, firmware, micro-codes, circuits, data, databases, data structures, tables, arrays, and variables. Functions provided by elements and modules may be combined with a small number of elements and modules or may be subdivided into additional elements and modules. Furthermore, the elements and modules may execute one or more central processing units (CPUs) within a device.

Some example embodiments may be embodied through a medium including a computer-readable code/command for controlling at least one processing element of the above-described embodiments, for example, a computer-readable medium. The medium may correspond to a medium that enables storage and/or transmission of the computer-readable code. The medium may be non-transitory.

In an illustrative embodiment, the computer-readable code is recorded in a medium or transmitted through the Internet. Examples of the medium include read-only memory (ROM), random-access memory (RAM), CD-ROMs, magnetic tapes, floppy disks, optical data storage devices, and carrier waves such as data transmission through the Internet. The medium may also be a non-transitory computer-readable medium. Since the mediums can also be distributed networks, the computer-readable code can be stored, transmitted, and executed in a distributed fashion.

The memory 320 may include any device capable of storing data including magnetic storage, flash storage, etc. The memory 320 may store various information utilized by the URs 300, for example, routing information and configuration information discussed in more detail below. The memory 320 may temporary store data, which is required during the execution of the program.

Hereinafter, a description of the functions performed by the URs 300 in order to determine an uplink according to some example embodiments will be described.

Figure 4A:
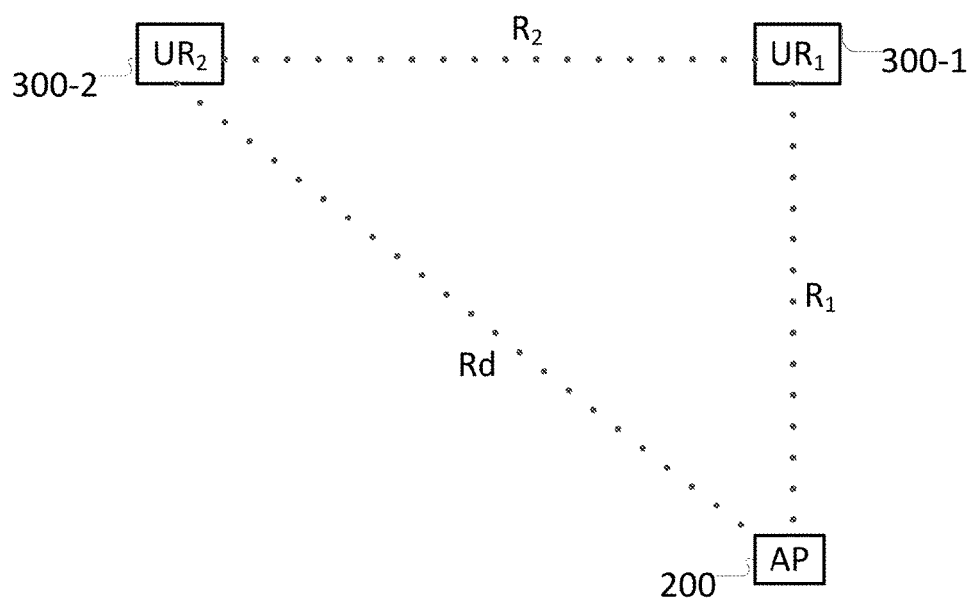
FIGS. 4A to 4C illustrate various connection configurations available when a plurality of universal repeaters (URs) are in a networking environment according to some example embodiments.
Figure 4B:
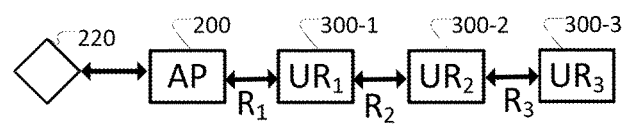
Figure 4C:
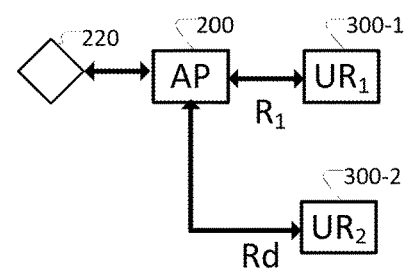

FIGS. 4A to 4C illustrate various connection configurations available when a plurality of universal repeaters (URs) are in a networking environment according to some example embodiments.

Referring to FIGS. 4A to 4C, URs 300 have multiple uplink connection paths available thereto. For example, a first UR 300-1 may associate either directly with the access point (AP) 200 or associate with a second UR 300-2. Likewise, the second UR 300-2 may associate with either the AP 200 or the first UR 300-1.

FIG. 4A shows these various possible associations, while FIG. 4B illustrates a direction association from the AP 200 to a first UR 300-1 which in term associates with a second UR 300-2, which in turn associates with a third UR 300-3, and FIG. 4C illustrates direction association from the AP 200 to both the first UR 300-1 and the second UR 300-2.

RSSI Based Connection of Multiple URs.

Conventionally, the URs 300 may determine their uplink based only on the signal strength between the respective UR 300 and the various uplink options.

In IEEE 802.11 based WLANs, the signal strength may be represented via a Received Signal Strength Indicator (RSSI), where a higher RSSI indicates a higher signal strength. However, while determining an uplink based on signal strength may work well for one-hop transmissions, it may not be the best metric of transmission rate in a multi-hop configuration.

For example, in two-hop transmission, the same data may need to be transmitted two times, namely a first transmission may occur between the UR 300-1 and the UR 300-2 at a data rata $R_1$ and a second transmission may occur between the UR 300-2 and the AP at a data rata $R_2$. Hence, when the first UR 300-1 uploads data to the AP 200 via the second UR 300-2, the first UR 300-1 may achieve an end-to-end data rate $R_E$ that is lower than a direct connection $R_D$ between the first UR 300-1 and the AP 200, even if $R_2$ is greater than $R_D$.

For example, referring to FIG. 4A, if data rata $R_1$ is 100 Mbps between AP 200 and the first UR 300-1, data rata $R_2$ is 100 Mbps between the first UR 300-1 and the second UR 300-2, while the direct connection data rate $R_D$ is 70 Mbps between AP 200 and the second UR and the second UR 300-2, then the total end-to-end data rate $R_E$ between AP 200 and the second UR 300-2, through the first UR 300-1 may be 50 Mbps, which is less than the direct connection data rate $R_D$ between AP 200 and the second UR 300-2, even though the immediate data rate connection $R_2$ between the first UR 300-1 and the second UR 300-2 is higher than the direct data rate connection $R_D$ between the second UR 300-2 and the AP 200.

FIG. 5 illustrates a structure of a beacon frame according to some example embodiments.

Referring to FIG. 5, a beacon packet 500 may include:

a source address (SA) identifying from which device the beacon frame is transmitted. In some example embodiments, the source address SA may be an address of an AP 200 or a UR 300;

a destination address (DA) 502 identifying to which device the beacon frame is transmitted. In some example embodiments, the beacon packet 500 may be a broadcast packet such that all network entities including the UEs 100, APs 200 and URs 300 are able to receive the beacon packet 500;

a BSSID identifying the MAC address of the AP 200;

a timestamp identifying the current local time at the AP 200 or the UR 300 that generates the beacon packet. In 802.11, the timestamp may be a 64-bit value that is initialized to zero and incremented once every microsecond;

capability information indicating various information about the AP 200 or the UR 300. For example, the capability information may indicate whether the AP 200 or the UR 300 is associated with ad-hoc infrastructure, supports encryption, supports usage of short preambles, etc.;

a Service Set Identification (SSID) number identifying the wireless network associated with the AP 200 or the UR 300. The SSID may, for example, correspond to the name of a wireless network displayed on the UEs 100 to a user;

one or more supported data rates which may identify the supported transmission rates of the AP 200 or the UR 300;

a FH parameter set which may specify information usable to facilitate frequency hopping. The FR parameter set may include, for example, a dwell time for staying on a particular channel, an indication of the hop pattern, an index identifying the current point in the hop pattern;

a WiFi Traffic Indication Map (TIM) which may specify information usable to by the UEs 100 in a low power mode to determine whether the AP 200 or the UR 300 has buffered frames for the UE 100 while the UE 100 was operating in a low power mode; and an Information Element (IE) field which may include vendor specific parameters. In some example embodiments, this field may be utilized to indicate the end-to-end throughput or the number of hops to reach to the AP 200.

Under IEEE 802.11, the AP 200 may periodically transmit the beacon packet 500 in order to announce its presence to the UEs 100. The beacon packet 500 may be a type of management packet implemented in IEEE 802.11 based WLANs, which contains information about the network including but not limited to the modulation and coding schemes and encryption types supported by the AP 200.

When the UR 300 receives a beacon packet 500 from the AP 200, IEEE 802.11 based authentication (e.g., Wi-Fi Protected Access (WPA) 1 or WPA 2) may be utilized so that the UR 300 may attach to the WLAN. The authentication phase provides a proof of identity for the UE 100 to gain access to the WLAN. Once the UR 300 is authenticated, it associates with the AP 200 so that the AP 200 can deliver data to the UR 300.

FIG. 6 is a flow chart illustrating a method of an initial universal repeater (UR) determining an uplink according to some example embodiment.

Referring to FIG. 6, at operation S605, the UR 300-1 is initialized. For example, the UR 300-1 may start operation by being deployed in the network or during a reboot operation due to a software update or power loss. Further, the UR 300-1 may periodically start operation S605.

At operation S610, the UR 300-1 listens on the wireless medium for beacon packets from the AP 200 and other URs 300-2. Due to the limited coverage of the AP 200 and the other URs 300-2 and the fading effect of wireless transmission, the UR 300-1 may not receive beacon frames from AP 200 and/or the other URs 300-2.

If the UR 300-1 receives beacon packets, in operation S615, the UR 300-1 may determine whether the beacon packets 500 are received from an AP 200 or another UR 300-2. For example, in some example embodiments, the UR 300-1 may determine whether the beacon packets are received from AP 200 or another UR 300-2 based on a media access control (MAC) address. The MAC address may be determined by analyzing the first field of the beacon packet 500. In other example embodiments, the UR 300-1 may determine whether the beacon packet 500 is received from AP 200 or another UR 300-2 by checking the information element (IE) field in the received beacon packets 500. For example, the other UR 300-2 may insert a "0" in the IE field to indicate that a UR is sending the beacon packet 500 rather than an AP, while the AP 200 may insert a "1" in the IE field to indicate that an AP is sending the beacon packet 500.

In operation S620, the UR 300-1 that received the beacon packets 500 may measure the signal strength of the received beacon packets 500. The UR 300-1 may compare the RSSI value associated with the beacon packet received by the UR 300-1 from the AP 200 with the RSSI value associated with beacon packets 500 received by the other URs 300-1 from the AP 200 and transmitted to the UR 300-1 via their associated beacon packets 500. The UR 300-1 may determine if the beacon packet 500 received thereat from the AP 200 have a relatively highest RSSI value among the beacon packets 500 received by the other URs 300-2.

In operation S625, if the UR 300-1 determines that the beacon packets 500 received thereat from the AP 200 have the highest signal strength, the UR 300-1 may associate directly with the AP 200. Further, the UR 300-1 may calculate an end-to-end throughput $R_E$ using the beacon packet 500 received from the AP 200. The UR 300-1 may insert an RSSI indicator into the information element (IE) field of a new beacon associated with the UR 300-1 and transmit the new beacon to the other URs 300-2 such that the other URs 300-2 may utilize the RSSI to determine their associated uplinks in a similar manner to that described herein.

In operation S630, if the UR 300-1 determines that beacon packets received at one of the other URs 300-2 have a higher signal strength than the beacon packets received at the UR 300-1, then the UR 300-1 may wait one of the other URs 300-2 to associate with the AP 200.

FIG. 7A is a flow chart illustrating a method of subsequent universal repeaters (URs) determining an uplink according to some example embodiment.

Referring to FIG. 7A, after the first UR 300-1 connects to the AP 200 in operation S625, and broadcasts its end-to-end throughput $R_E$ within its beacon frames, the other URs 300-2 may either associate directly with the AP 200 or with another UR 300. The other URs 300-2 may determine which of the URs 300 or AP 200 to associate with based on the beacon frames transmitted by the first UR 300-1 and the AP 200.

In operation S705, the other URs 300-2 may determine whether they have received beacon frames from either the first UR 300-1 that is associated with the AP 200 and contains end-to-end throughput $R_E$ information or received beacon frames directly from the AP 200.

If in operation S705, the other URs 300-2 determine that they have not received a beacon frame with end-to-end rate information and/or a beacon frame directly from the AP 200, then the other URs 300-2 may wait until they receive such a beacon frame to make their own association decision.

In operation S710, if the other URs 300-2 receive beacon frames with end-to-end rate information and/or the beacon frames directly from the AP 200, the other URs 300-2 may calculate all possible end-to-end throughput $R_E$ by using the beacon frames received from the first UR 300-1 that is already connected to the AP 200. Further, the other URs 300-2 may calculate their own direct throughput $R_D$ rate to the AP 200, if the received beacon frame is from the AP 200.

In operation S715, each of the other URs 300-2 may determine whether their respective end-to-end throughput is greater through the direct connection to AP 200 or through another UR 300.

Referring back to FIG. 4, the URs 300 may determine whether their respective end-to-end throughput $R_E$ is greater through the direct connection $R_D$ to AP 200 or through an indirection connection through another UR 300 based on equation 1 below:

$$R_{E,indirect} = \left(\frac{1}{r_1} + \frac{1}{r_2}\right)^{-1} \quad \text{Equation 1}$$

where $R_{E,\ indirect}$ is the end-to-end throughput, $R_2$ is the data rate between the AP 200 and the first UR 300-1 and $R_1$ is the data rate between the first UR 300-1 and the second UR 300-2.

In operation S720, if the other UR 300-2 determines that it will achieve higher end-to-end throughput $R_E$ via a direct connection to the AP 200, then the other UR 300-2 associates with the AP 200. Further, the UR 300-2 may broadcast its own updated beacon packets indicating the end-to-end throughput $R_E$ achieved by the UR 300-2.

In operation S725, if the other UR 300-2 determines that it will achieve higher end-to-end throughput $R_E$ by connecting through one of the other URs 300, then the UR 300-2 may associate with the UR 300 that provides the greatest end-to-end throughput $R_E$. Further, the UR 300-2 may broadcast its own updated beacon packets indicating the achieved end-to-end throughput $R_E$.

This process may continue on until all URs 300 determine a desired path based on the end-to-end throughput $R_E$ to connect to the AP 200.

Figure 7B:
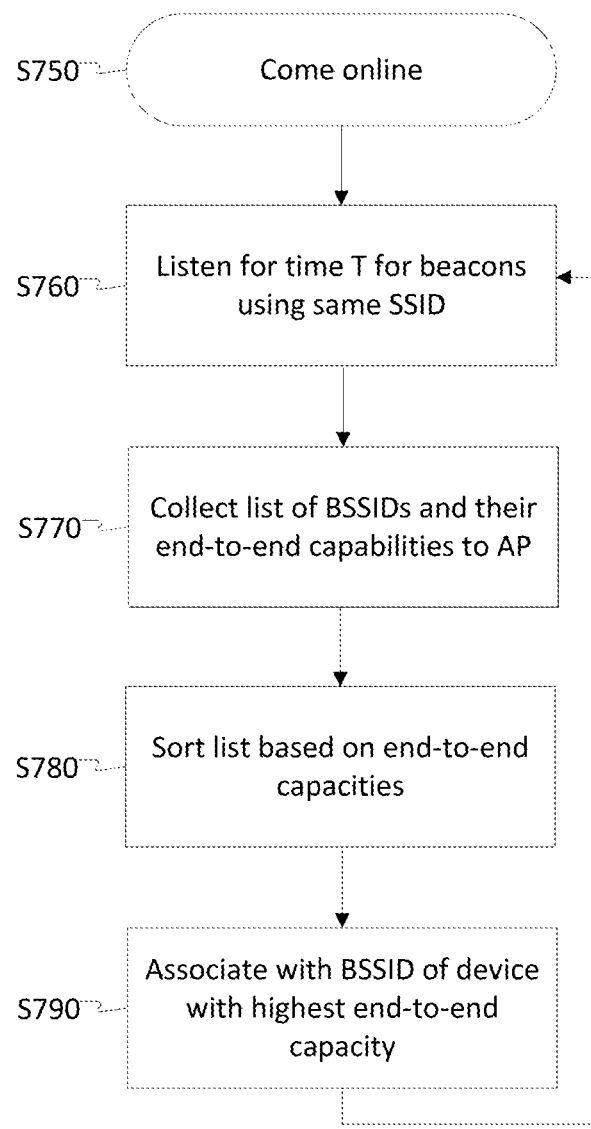
FIG. 7B is a flow chart illustrating a method of a universal repeater (UR) determining an uplink according to some example embodiments.

FIG. 7B is a flow chart illustrating a method of a universal repeater (UR) determining an uplink according to some example embodiments.

Referring to FIG. 7B, in operation S750, the UR 300-1 may come online, in operation S760, the UR 300-1 may listen for time T (e.g., for 1 second) for beacons using the same SSID, in operation S770, the UR 300-1 may collect a list of BSSIDs and their respective end-to-end capabilities to the AP 200, in operation S780, the UR 300-1 may sort the list based on end-to-end capacities, in operation S790, the UR 300-1 may associate as a station (STA) with the BSSID of a device having the highest end-to-end capacity. Thereafter, in some example embodiments, the UR 300-1 may continually perform operations S760 to S790, for example, when the end-to-end-capabilities of the UR 300-1 to the AP through the associated uplink device fail below a threshold.

The UR 300 may dynamically associate with the network, thereby extending the range of the network whilst providing a relatively more efficient throughput from that universal repeater to the network gateway. Thereafter, a newly introduced URs 300 may connect to the network without requiring that the existing devices in the network modify their properties in order to adapt to the newly introduced UR 300. When the UR 300 has associated as a STA to the BSSID of the device with the highest end-to-end capacity, third party devices may be able to integrate with the network, while benefiting from the optimized data throughput.

Hop-Count Based Connection of Multiple URs

Referring back to FIG. 4, as illustrated in FIG. 4B, if the closest UR to the second UR 300-2 is a third UR 300-3, the beacon packets received by the second UR 300-2 from the third UR 300-3 may have the greatest the RSSI value. Likewise, the beacon packets received by the third UR 300-3 from the second UR 300-2 may also have the greatest the RSSI value. If the URs 300 associate based on signal strength, then the second and third URs 300-2 and 300-3 may associate with each other such that neither can communicate with the AP 200. Therefore, performing association based only on signal strength may cause communication loops that prevent communication between the URs 300 and the AP 200. Thus, it may be desirable for the URs 300 to use other metrics either alone or in conjunction with signal strength when determining an uplink.

For example, in some example embodiments, the URs 300 make association decisions, at least in part based on a number of hops between the UR 300 and the AP 200. However, when a UR 300 begins operation, the UR 300 may not be aware of the number of hops needed to reach the AP 200. Hence, without this information, the UR 300 may not be able to make an informed decision regarding an uplink to associate therewith.

In some example embodiments, the URs 300 may make association decisions, at least in part based on the Physical Layer bitrate (PHY rate), for example, based on which route offers the higher PHY rate. For example, the URs 300 may choose to associate with a 3×3 IEEE 802.11 ac device with an RSSI=−70 dBm over a 2×2 IEEE 802.11n device with RSSI=−65 dBm, as the former would offer a higher PHY rate. Advantageously, using the PHY rate as opposed to the RSSI provides relatively precise information regarding bandwidth, the modulation and coding scheme that is being used and the number of spatial chain.

In some example embodiments, the AP 200 may periodically broadcast a beacon frame to the URs 300. The information element (IE) field of the beacon frame may indicate a number of hops traversed to reach the UR 300.

FIG. 8 illustrates a flow chart of a universal repeater (UR) determining an uplink according to some example embodiment.

Referring to FIG. 8, in operation S805, the UR 300-1 starts its operation. For example, the UR 300-1 may start operation by being deployed in the network or during a reboot operation due to a software update or power loss. Further, the UR 300-1 may periodically start operation S805.

In operation 8810, the UR 300-1 may enter a receiving mode in which the UR 300-1 listens for beacon packets transmitted by the AP 200 and/or other URs 300-2 in the network.

In an effort to ensure that the UR 300-1 receives the beacon packets, the UR 300-1 may be programmed to remain in the receiving mode for a period of time that is greater than an interval in which the AP 200 periodically transmits the beacon packets.

If the UR 300-1 receives the beacon packets, in operation S815, the UR 300-1 may analyze the Information Element (IE) field in the received beacon packets.

The IE field may contain information indicating the number of hops required for the UR 300-1 to reach to the AP 200. If the UR collects N different beacon packets, then the number of hops associated with each beacon packet may be denoted as $\alpha_1, \alpha_2, \ldots \alpha_N$. For example, $\alpha_N$ may denote the number of hops for $UR_N$ 300-N to reach the AP 200.

In operation S820, the UR 300-1 may associate with the AP 200 or another UR 300-2 based on the number of hops. For example, the UR 300-1 may associate with one of the other URs 300-2 that provides the minimum number of hops to the AP 200. For example, the UR 300-1 may associate with $UR_k$ using Equation 2 below:

$$k = \underset{N}{\mathrm{argmin}}\, \alpha_N \qquad \text{Equation 2}$$

where k is the other UR 300-2 that the UR 300-1 associates with and $\alpha_N$ is the number of hops.

In operation S825, the UR 300-1 may set the Information Element (IE) field in its own beacon packet to $\alpha+1$ and broadcast the beacon packets having the updated IE field to the other URs 300-2.

If in operation S810, the UR 300-1 does not receive beacon packets within the wait time, the UR 300-1 may optionally perform an uplink correction procedure in operation S900.

Figure 9:
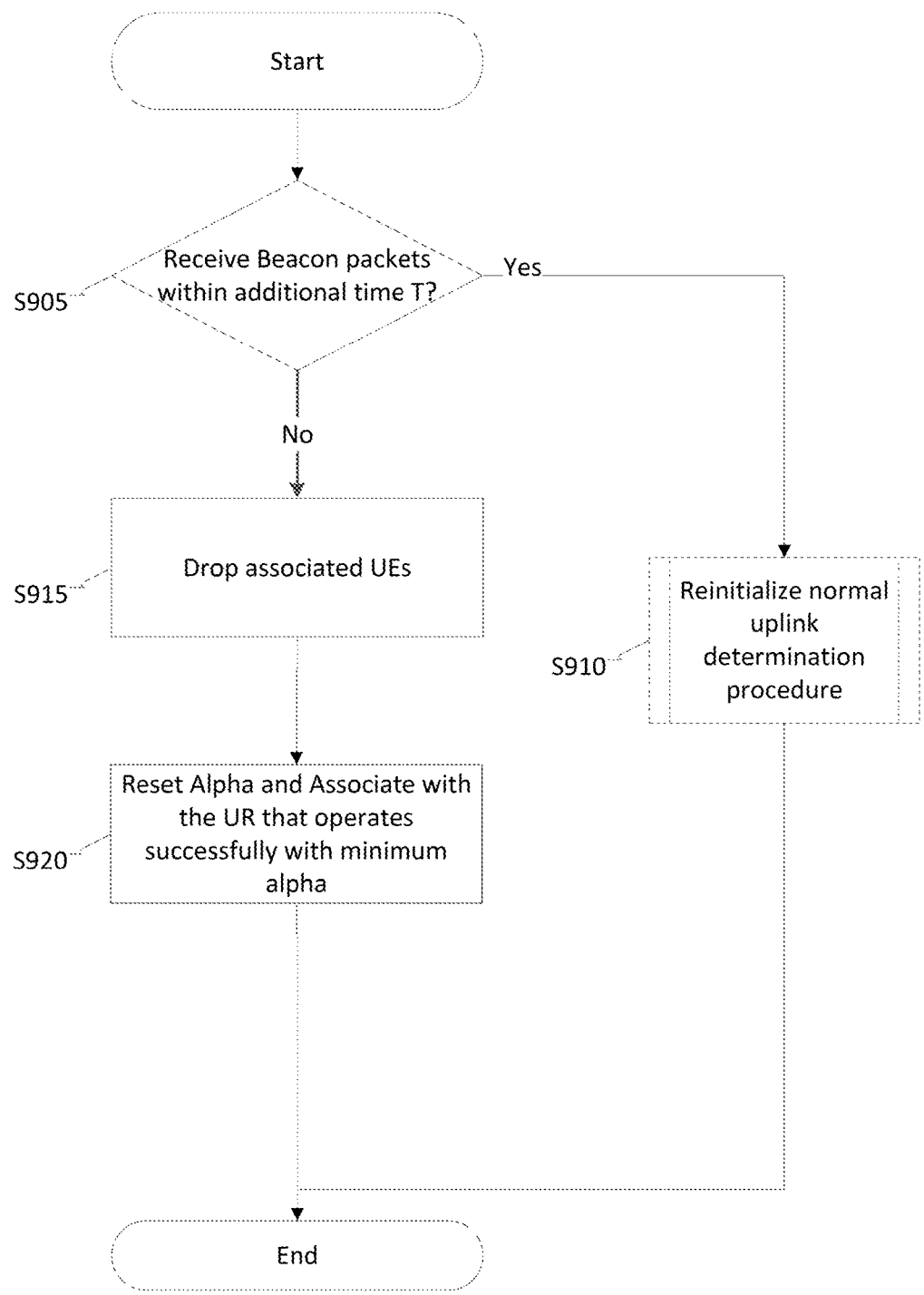
FIG. 9 is a flow chart illustrating a method of a universal repeater (UR) performing an uplink correction procedure according to some example embodiments.

FIG. 9 illustrates a flow chart of a universal repeater (UR) performing an uplink correction procedure according to some example embodiment.

Referring to FIG. 9, the UR 300-1 may perform an uplink correction procedure if the UR 300-1 does not receive beacon packets from the AP 200 within the listening time. For example, the UR 300-1 may not receive the beacon packets if the AP 200 is offline.

In operation S905, the UR 300-1 may continue to listen for the beacon packets for a desired (or, alternatively, a predetermined) additional amount of time T. The UR 300-1 may wait the additional time T to prevent a false alarm from occurring due to the wireless channel or short disconnection and/or rebooting issues.

In operation S910, if the UR 300-1 receives beacon packets from the AP 200 and/or other URs 300-2 in the network, the UR 300-1 may perform a normal uplink determination procedure. For example, the UR 300-1 may perform the uplink determination procedure discussed above with reference to FIG. 8.

In operation S915, if the UR 300-1 does not receive the beacon packets within the additional time T, the UR 300-1 may determine that the UR 300-1 is not functioning and may drop any user equipment (UEs) 100 that are associated with the UR 300-1. Thereafter, the UEs 100 may associate with the AP 200 or with another UR 300-2 that has a functioning uplink to the AP 200.

In operation S920, UR 300-1 determines the optimal uplink associated with the AP 200 or with another UR 300-2 by recalculating the minimum number of hops between UR 300-1 and the AP 200. The UR 300-1 may determine the optimal uplink in accordance with the procedure described in relation to operation S820 of FIG. 8.

The example embodiments described above provide a solution to extend a coverage area of a WLAN network and provide a better rate of data transmission between the devices of such WLAN network and the AP of the WLAN network. One advantage of the example embodiments described above are improving network connectivity that may have otherwise been sub-optimal due to conditions of the wireless medium (e.g., presence of walls, etc., that negatively impact network connectivity). Another advantage of the example embodiments is to provide an alternative approach to increasing transmit power for extending the network coverage and improving the network connectivity.

Variations of the example embodiments are not to be regarded as a departure from the spirit and scope of the example embodiments, and all such variations as would be apparent to one skilled in the art are intended to be included within the scope of this disclosure.

For example, in some example embodiment, the communication between the UR 300-1 and the other URs 300-2 may be improved through the use of a Cocktail Party Side Conversation operation, as discussed in U.S. patent application Ser. No. 13/972,736, titled: Cocktail party: side conversations and talking over in wireless mesh networks, the entire contents of which are hereby incorporated by reference. In a Cocktail Party Side Conversation operation, during transmission, the UR 300-1 and/or UR 300-2 may lower their respective power to increase the efficiency of the transmissions. For example, the URs 300 may include instructions that, when executed, configure their associated processors 330 to lower the power used by their respective interfaces 310 while forwarding the data packets. Hence, the achievable data rate between the URs 300 may increase.

What is claimed:

1. A universal repeater (UR) comprising:
an interface configured to interface wirelessly with a selected uplink along a route between the UR and an access point (AP) in a network having a plurality of candidate uplinks; and
a memory having machine executable code therein that, when executed by a processor, causes the processor to,
determine the selected uplink based on data received from the plurality of candidate uplinks,
instruct the interface to pair with the selected uplink thereby to form an association between the UR and the selected uplink, the data received from the plurality of candidate uplinks being indicative of an end-to-end throughput from the UR to the AP via each of the plurality of candidate uplinks,
determine whether the UR receives data from the AP upstream of the UR within a set amount of time, and
instruct the interface to disassociate any associated user equipment (UE), when the UR does not receive the data from the AP upstream of the UR during a set amount of time, wherein the disassociated UE associates with the AP or a further UR with a functioning uplink to the AP.

2. The UR of claim 1, wherein
the data is piggybacked in one or more fields of beacon packets, and
the processor is configured to demodulate the beacon packets to read the data.

3. The UR of claim 2, wherein the beacon packet is a management packet defined by IEEE 802.11.

4. The UR of claim 1, wherein the processor is configured to determine the selected uplink based on the end-to-end throughput of each of the plurality of candidate uplinks.

5. The UR of claim 1, wherein the machine executable code, when executed by the processor, causes the processor to determine the uplink based at least in part on a number of hops between the UR and the AP.

6. The UR of claim 1, wherein the machine executable code, when executed by the processor, causes the processor to determine the selected uplink by,
receiving beacon packets from the plurality of candidate uplinks,
determining a number of hops between the plurality of candidate uplinks and the AP, and
pairing with one of the plurality of candidate uplinks based on the determined number of hops.

7. The UR of claim 6, wherein the machine executable code, when executed by the processor, causes the processor to determine the number of hops by analyzing an information element (IE) field included in the received beacon packets.

8. The UR of claim 6, wherein the machine executable code, when executed by the processor, causes the processor to pair with the candidate uplink having a lowest number of hops to the AP.

9. The UR of claim 6, wherein the machine executable code, when executed by the processor, causes the processor to determine the selected uplink based on a number of hops between the UR and the AP and one or more of a signal strength and a Physical Layer bitrate between the UR and the plurality of candidate uplinks.

10. The UR of claim 1, wherein the machine executable code, when executed by the processor, causes the processor to broadcast a new beacon packet to the plurality of candidate uplinks after pairing with one of the plurality of candidate uplinks, the new beacon packet including an indication of a number of hops between the UR and the AP over the selected route.

11. The UR of claim 1, wherein the interface is configured to pair with the determined selected uplink over a media access control (MAC) layer therein.

12. The UR of claim 1, wherein the network is a wireless network operating based on IEEE 802.11 standard.

13. A method of determining a selected uplink for a universal repeater (UR), the method comprising:

determining the selected uplink based on data received from a plurality of candidate uplinks;
instructing an interface to wirelessly pair with the uplink along a selected route between the UR and an access point (AP) in a network, the data received from the plurality of candidate uplinks being indicative of an end-to-end throughput from the UR to the AP via each of the plurality of candidate uplinks;
determining whether the UR receives data from the AP upstream of the UR within a set amount of time; and
instructing the interface to disassociate any associated user equipment (UE), when the UR does not receive the data from the AP during a set amount of time, wherein the disassociated UE associates with the AP or a further UR with a functioning uplink to the AP.

14. The method of claim 13, wherein the data is piggybacked in one or more fields of beacon packets defined by IEEE 802.11, and the method further comprises:
demodulating the beacon packets to read the data.

15. The method of claim 13, wherein the determining the uplink determines the selected uplink based on the end-to-end throughput of each of the plurality of candidate uplinks.

16. The method of claim 13, wherein the determining the selected uplink determines the selected uplink by,
receiving beacon packets from the plurality of candidate uplinks,
determining a number of hops between the plurality of candidate uplinks and the AP, and
pairing with one of the plurality of candidate uplinks based on the determined number of hops.

17. The method of claim 16, wherein the determining the number of hops determines the number of hops by analyzing an information element (IE) field included in the received beacon packets.

18. A non-transitory computer readable medium comprising instructions that, when executed by a processor associated with a Universal Repeater (UR), causes the processor to execute a method, the method including,
determining a selected uplink for the UR based on data received from a plurality of candidate uplinks;
instructing an interface of the UR to wirelessly pair with the selected uplink along a selected route between the UR and an access point (AP) in a network, the data received from the plurality of candidate uplinks being indicative of an end-to-end throughput from the UR to the AP via each of the plurality of candidate uplinks;
determining whether the UR receives data from the AP upstream of the UR within a set amount of time; and
instructing the interface to disassociate any associated user equipment (UE), when the UR does not receive the data from the AP during a set amount of time, wherein the disassociated UE associates with the AP or a further UR with a functioning uplink to the AP.

* * * * *